(12) United States Patent
Koide

(10) Patent No.: US 8,972,638 B2
(45) Date of Patent: Mar. 3, 2015

(54) SERIAL DATA COMMUNICATION SYSTEM AND SERIAL DATA COMMUNICATION METHOD

(75) Inventor: Hiroyuki Koide, Tokyo (JP)

(73) Assignee: Kowa Company, Ltd., Aichi (JP)

( * ) Notice: Subject to any disclaimer, the term of this patent is extended or adjusted under 35 U.S.C. 154(b) by 498 days.

(21) Appl. No.: 12/678,318

(22) PCT Filed: Sep. 17, 2008

(86) PCT No.: PCT/JP2008/066722
§ 371 (c)(1),
(2), (4) Date: Mar. 16, 2010

(87) PCT Pub. No.: WO2009/038070
PCT Pub. Date: Mar. 26, 2009

(65) Prior Publication Data
US 2010/0199009 A1  Aug. 5, 2010

(30) Foreign Application Priority Data

Sep. 18, 2007 (JP) .................................. 2007-240495
Sep. 18, 2007 (JP) .................................. 2007-240502

(51) Int. Cl.
*G06F 13/00* (2006.01)
*H04L 1/00* (2006.01)
*H04L 7/00* (2006.01)
*H04L 7/04* (2006.01)

(52) U.S. Cl.
CPC ............. *H04L 1/0079* (2013.01); *H04L 7/0008* (2013.01); *H04L 7/041* (2013.01)
USPC .......................................... 710/104; 710/110

(58) Field of Classification Search
USPC .................................................. 710/110, 104
See application file for complete search history.

(56) References Cited

U.S. PATENT DOCUMENTS

| 4,700,358 A | | 10/1987 | Duncanson et al. |
| 4,879,731 A | * | 11/1989 | Brush ............................. 375/368 |
| 5,570,284 A | * | 10/1996 | Roselli et al. ...................... 701/2 |
| 5,592,628 A | * | 1/1997 | Ueno et al. ..................... 709/200 |
| 5,631,644 A | * | 5/1997 | Katata et al. ..................... 341/67 |
| 7,281,082 B1 | * | 10/2007 | Knapp ........................... 711/103 |
| 7,983,634 B2 | * | 7/2011 | Perrin et al. ................ 455/114.1 |
| 2004/0228612 A1 | * | 11/2004 | Ono et al. ........................ 386/46 |
| 2004/0237114 A1 | * | 11/2004 | Drazin ........................... 725/105 |

(Continued)

FOREIGN PATENT DOCUMENTS

| JP | H01-220544 | 9/1989 |
| JP | H05-134736 | 6/1993 |

(Continued)

*Primary Examiner* — Nimesh G Patel
(74) *Attorney, Agent, or Firm* — Duane Morris LLP

(57) ABSTRACT

When transmitting serial data from a master device to a slave device, it is possible to promptly detect a communication error if any occurs. Serial data transmitted from the master device to the slave device has two or more continuous bytes of dummy data having an identical structure. When the slave device recognizes the dummy data, communication error processing is executed. Assume that the serial data is shifted by an affect of a noise. In this case, "a text end control code (ETX)" is also shifted and the serial data cannot be recognized and no data reception end process is executed. However, during a period after this, a part of the first dummy data and a part of the second dummy data are received and one dummy data is recognized. Thus, the slave device can promptly execute the communication error processing.

4 Claims, 15 Drawing Sheets

(56) References Cited

U.S. PATENT DOCUMENTS

| | | | |
|---|---|---|---|
| 2005/0268142 A1* | 12/2005 | Saripalli et al. | 713/600 |
| 2006/0080094 A1* | 4/2006 | Katayama et al. | 704/229 |
| 2006/0161687 A1* | 7/2006 | Holt | 709/248 |
| 2008/0059768 A1* | 3/2008 | Hung et al. | 712/43 |
| 2008/0259935 A1* | 10/2008 | Grottel et al. | 370/396 |
| 2011/0087948 A1* | 4/2011 | Murakami et al. | 714/758 |

FOREIGN PATENT DOCUMENTS

| | | |
|---|---|---|
| JP | H06-243052 | 9/1994 |
| JP | H10-200602 | 7/1998 |
| JP | 2003-163653 | 6/2003 |
| JP | 2004-015270 | 1/2004 |
| WO | WO00-45281 | 8/2000 |

\* cited by examiner

FIG. 1
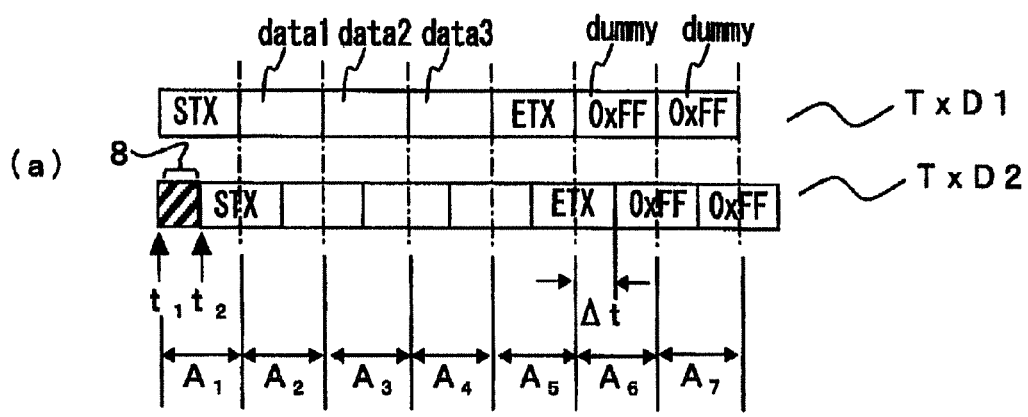
(a)
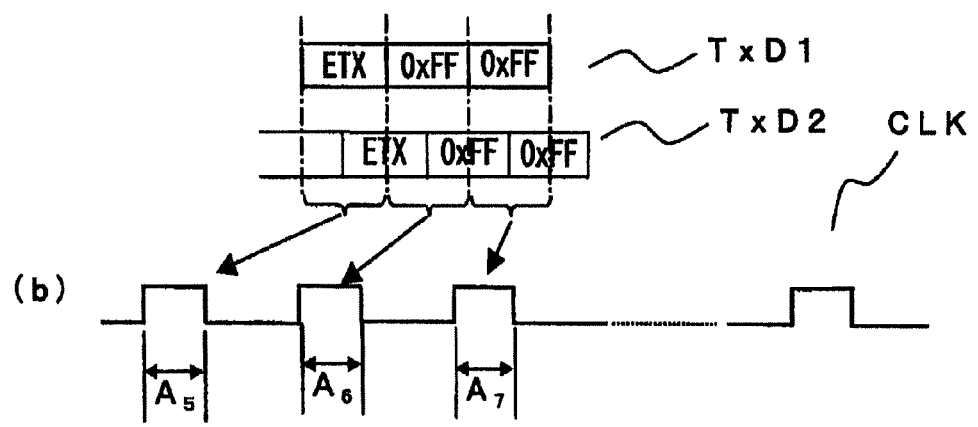
(b)

F I G. 5
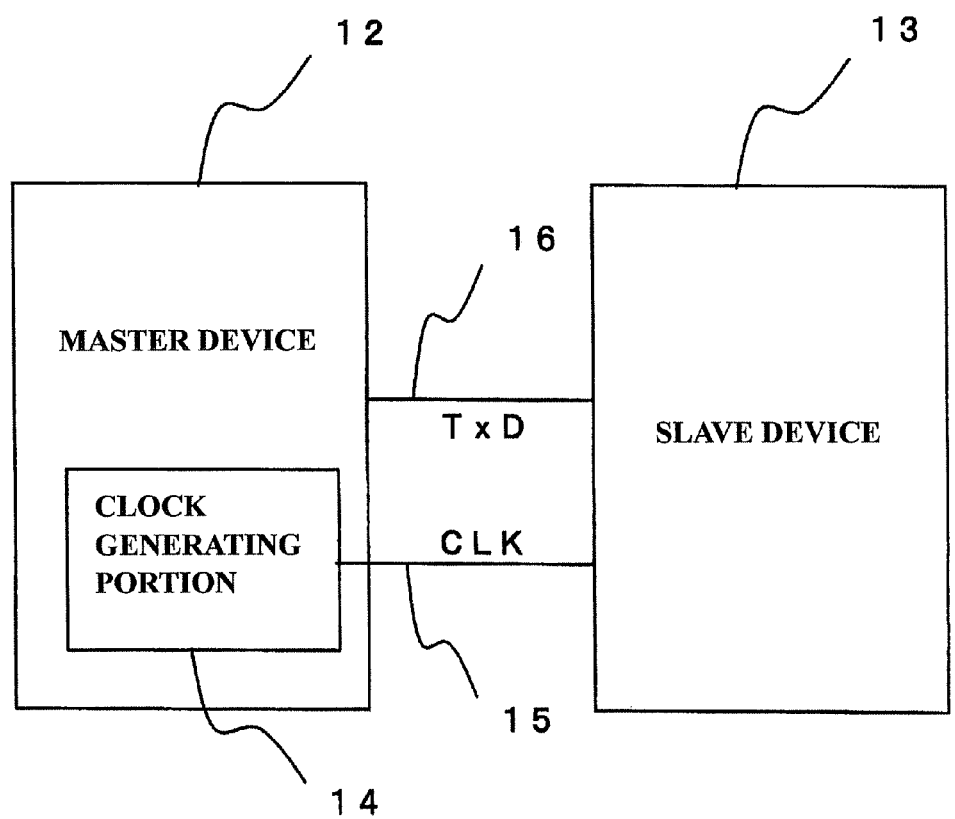

F I G. 6
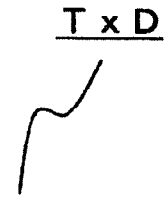
| S T X | data1 | data2 | data3 | E T X |

F I G. 1 3
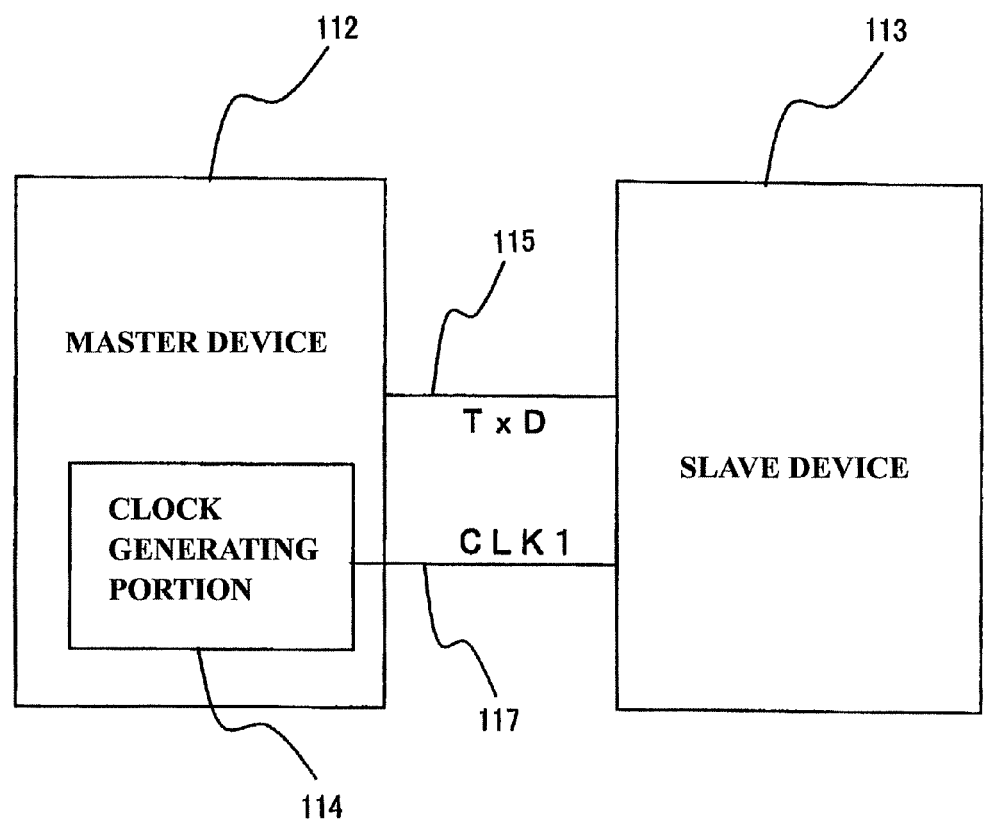

F I G. 1 5
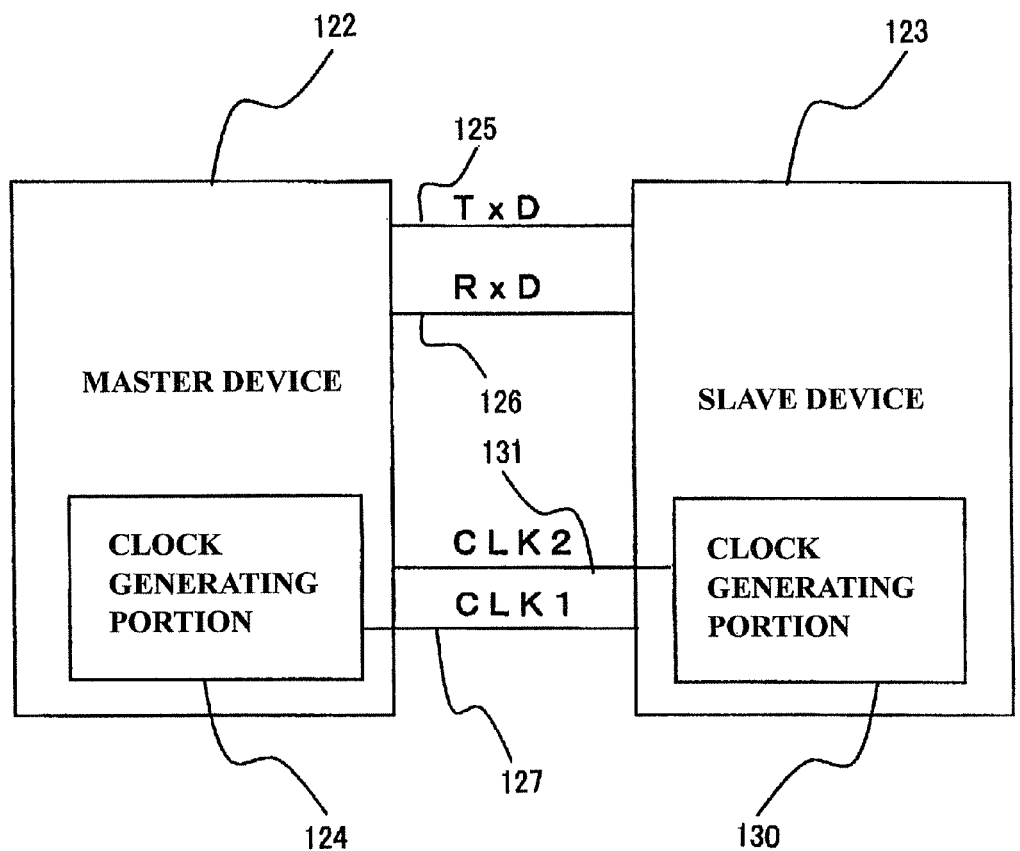

SERIAL DATA COMMUNICATION SYSTEM AND SERIAL DATA COMMUNICATION METHOD

TECHNICAL FIELD

This invention relates to a clock synchronization type serial data communication system and a serial data communication method. Besides, this invention relates to a serial data communication system and a serial data communication method for transmitting clock signals from a master device to a slave device and for a duplex communication of serial data between the master device and the slave device.

BACKGROUND ART

The clock synchronization type serial data communication systems and the serial data communication methods have been used in various devices. In such a serial data communication, it is necessary for a data reception side (the slave device) to detect finish of reception of data. Prior instances 1 to 3 are now explained.

<First Prior Art>

FIG. 5 is a block diagram that shows a conventional structure of a serial data communication system, a reference number 12 in the figure shows a master device, a reference number 13 shows a slave device, a reference number 14 is a clock generating portion for generating clock signals CLK, a reference numeral 15 denotes a clock line for transmitting the clock signals CLK, and a reference numeral 16 denotes a data line for transmitting serial data $T_xD$. In the system shown in the figure, the clock signals CLK are transmitted from the master device 12 to the slave device 13, and the serial data $T_xD$ are transmitted, synchronizing with the clock signals CLK. Such serial data $T_xD$ has STX (control code for text start) added before data body, data 1, data 2 and data 3, and ETX (control code for text finish) added after data body, data 1, data 2 and data 3, as shown in FIG. 6 such that the slave device 13 determines reception start and stores each data in a receive buffer (not shown) when recognizing STX, and determines reception prohibition and does command processing when recognizing ETX (see Japanese patent application publication No. H05-134736).

<Second Prior Art>

FIG. 7 is a block diagram which shows another instance of a conventional structure of a serial data communication system. In the system as shown in the figure, a handshake line 17 is provided in addition to the clock line 15 and the data line 16, and through the handshake line 17 a communication finish (that is, communication period) is notified to the slave device 13. An explanation of portions the same as FIG. 5 is not described by using the same reference numerals.

<Third Prior Art>

FIG. 8 is a block diagram that shows another alternate instance of a conventional structure of the serial data communication system. In such a system, a timer 18 is provided. Then, the timer 18 clocks from a point of time when the slave device 13 starts to receive the data (or from the point of time when receiving the last character data), and data receiving is compulsorily finished if no ETX is recognized after passing a predetermined time and an error processing is done (see Japanese patent application publication No. H10-200602). Similar to the above-mentioned, the explanation of portions the same as FIG. 5 is not described by using the same reference numerals.

In the past, the clock synchronization type serial data communication system and the serial data communication method have been used in various kinds of machines. A representative conventional structure of the communication system is now mentioned.

<Fourth Prior Art>

FIG. 13 is a block diagram that shows an instance of a conventional structure of the serial data communication system. In the figure, a reference numeral 112 denotes a master device, a reference numeral 113 denotes a slave device, a reference numeral 114 is a clock generating portion for generating clock signals, a reference numeral 115 denotes a data line for transmitting serial data $T_xD$, and a reference numeral 117 denotes a clock line for transmitting clock signals CLK. In the system in the figure, the clock signals CLK are transmitted from the master device 112 to the slave device 113, and the serial data $T_xD$ are transmitted synchronizing with the clock signals CLK.

Various kinds of structures of the communication system in which the serial data can be also transmitted from the slave device 113 to the master device 112 in addition to the transmitting of serial data from the master device 112 to the slave device 113 have been proposed (see Japanese patent applications publication Nos. H06-243052 and 2003-163653).

<Fifth Prior Art>

FIG. 14 is a block diagram that shows another instance of the conventional structure of the serial data communication system. In the figure, a reference number 122 denotes a master device, a reference number 123 shows a slave device, a reference number 124 is a clock generating portion for generating clock signals, a reference numeral 125 denotes a data line for transmitting serial data $T_xD$ from the master device 122 to the slave device 123, a reference numeral 126 is a data line for transmitting serial data $R_xD$ from the slave device 123 to the master device 122, a reference numeral 127 denotes a clock line for transmitting clock signals CLK1 from the master device 122 to the slave device 123, and a reference numeral 128 denotes a handshake line. In the communication system shown in the figure, the master device 122 transmits the clock signal CLK1 for reception to the slave device 123 and the slave device 123 informs the master device 122 of a transmittable condition through the handshake line 128 at a timing when transmission of data is prepared. Receiving this, the master device 122 transmits the clock signal CLK1 for reception to the slave device 123. Then, the serial data $R_xD$ is transmitted from the slave device 123 to the master device 122, synchronizing with the clock signal CLK1.

<Sixth Prior Art>

FIG. 15 is a block diagram that shows another alternate instance of the conventional structure of the serial data communication system. An explanation of portions the same as FIG. 14 is not described by using the same reference numerals. In the communication system in the figure, the slave device 123 is provided with a clock generating portion 130 for generating the clock signal CLK2, and the clock signal CLK2 is transmitted from the slave device 123 to the master device 122 through a handshake line 131 (or a line dedicated for transmitting the clock signals). With such a structure, the serial data $R_xD$ is transmitted from the slave device 123 to the master device 122, synchronizing with the clock signal CLK2.

DISCLOSURE OF INVENTION

Problems to be Solved by Invention

As mentioned above, the serial data $T_xD$ is transmitted from the master device 12 to the slave device 13, synchronizing with the clock signal CLK. In a case where garbage data (see reference numeral 8) is attached to the serial data as shown with a reference mark $T_xD_2$ in FIG. 1(a), serial data itself may be shift due to shift of synchronization (see Δt). If such a shift occurs in the system as shown in the above-mentioned first prior art, the slave device does not recognize ETX due to the shift of ETX, and a data waiting state continues for a long time without a processing for finish of data receiving, inconveniently. In the case of the above-mentioned third prior art, such a situation is avoided by clocking through the timer 18, but a data waiting state continues until finish of clocking, and it takes a longer time for return from the communication error. In the case of the prior art, it is necessary to add the timer, and a structure of the system itself is made complex and the cost is increased thereby.

On the other hand, in the case of the above-mentioned second prior art, the time to the return can be shortened since finish of data can be promptly known by making use of the handshake line 17. However, the structure of the system is made complex for adding the handshake line 17, and the cost is increased, inconveniently.

When the serial data is transmitted from the slave device 113 to the master device 112 in the system as shown in the fourth prior art, it is not possible to recognize the data due to no synchronization with the clock signal CLK. In other words, the clock signal CLK is transmitted at predetermined intervals from the master device 112 to the slave device 113, and the slave device 113 starts to transmit data at a stage where data transmission is prepared, regardless of the clock signal CLK. If the slave device 113 transmits the data in the middle of the clock, that is, if data is transmitted from the fourth bit without transmitting data from the first bit of the clock which is comprised of 8 bits, each data is transmitted extending over two clocks without transmitting one clock, so that the master device 112 is not possible to recognize each data. Besides, if the master device 112 is not possible to recognize ETX, a data waiting state still continues since data finish is not known.

If the handshake line 128 or the clock generating portion 130 is provided as shown in the fifth prior art or the sixth prior art, the master device 122 can recognize the data finish, but the structure is made complex for the reason that the handshake line or the clock generating portion is provided, and the cost is increased thereby.

An object of the invention is to provide a serial data communication system and a serial data communication method through which the above-mentioned respective problems can be solved.

One aspect of the invention is a serial data communication system for transmitting serial data from a master device to a slave device, synchronizing with a clock signal, characterized in that said master device transmits serial data, having two or more continuous bytes of dummy data having an identical structure, after data body, and said slave device judges finish of transmission of data when recognizing said dummy data.

Another aspect of the invention is the serial data communication system, wherein said two or more dummy data are all identical value in corresponding bits.

Another aspect of the invention is a serial data communication method for transmitting serial data from a master device to a slave device, synchronizing with a clock signal, characterized in that said master device transmits serial data having two or more continuous bytes of dummy data having an identical structure, after data body, and said slave device judges finish of transmission of data when recognizing said dummy data.

Another aspect of the invention is the serial data communication method, wherein said two or more dummy data are all identical value in corresponding bits.

Another aspect of the invention is a serial data communication system for transmitting a clock signal from a master device to a slave device, and for duplex communication of serial data between said master device and said slave device, characterized in that said slave device prohibits data transmission after transmitting serial data and fixes a state of a terminal into a high level or a low level, and said master device determines reception start and receives data from said slave device when recognizing signal excluding said state of terminal and prohibits reception when recognizing a signal showing said state of said terminal so as to analyze data.

Another aspect of the invention is the serial data communication system, wherein said master device computes amount of shift of data transmitted from said slave device by recognizing the signal showing the state of said terminal.

Another aspect of the invention is a serial data communication method for transmitting a clock signal from a master device to a slave device, and for duplex communication of serial data between said master device and said slave device, characterized in that said slave device prohibits data transmission after transmitting serial data and fixes a state of a terminal into a high level or a low level, and said master device determines reception start and receives data from said slave device when recognizing signal excluding said state of terminal and prohibits reception when recognizing a signal showing said state of said terminal so as to analyze data.

Another aspect of the invention is the serial data communication method, wherein said master device computes amount of shift of data transmitted from said slave device by recognizing the signal showing the state of said terminal.

Effects of Invention

According to the invention, even if the data transmitted to the slave device is shifted by an affect of a noise (also in error clock operation) or ETX is not recognized due to garbled character (unreadable character), it is possible to recognize the dummy data, and to know finish of the transmission of the serial data by recognizing the dummy data, and to do a proper processing.

According to the invention, even if the serial data received by the master device and the clock signal are not synchronized with each other or ETX is not recognized due to an affect of noise, the dummy data is recognized and finish of transmission of the serial data is known, so that each received data can be analyzed.

BRIEF DESCRIPTION OF DRAWINGS

FIG. 1(a) is a view for explaining a shift condition of serial data transmitted from a master device, and FIG. 1 (b) is a typical view for explaining operations at the time of data reception finish;

FIG. 5 is a block diagram that shows an instance of a conventional structure of the serial data communication system;

FIG. 6 is a view of a structure of data that shows an instance of a conventional structure of the serial data;

FIG. 13 is a block diagram that shows an instance of the conventional structure of the serial data communication system;

FIG. 15 is a block diagram that shows another alternate instance of the conventional structure of the serial data communication system.

EXPLANATION OF REFERENCE NUMBERS

Figure 2:
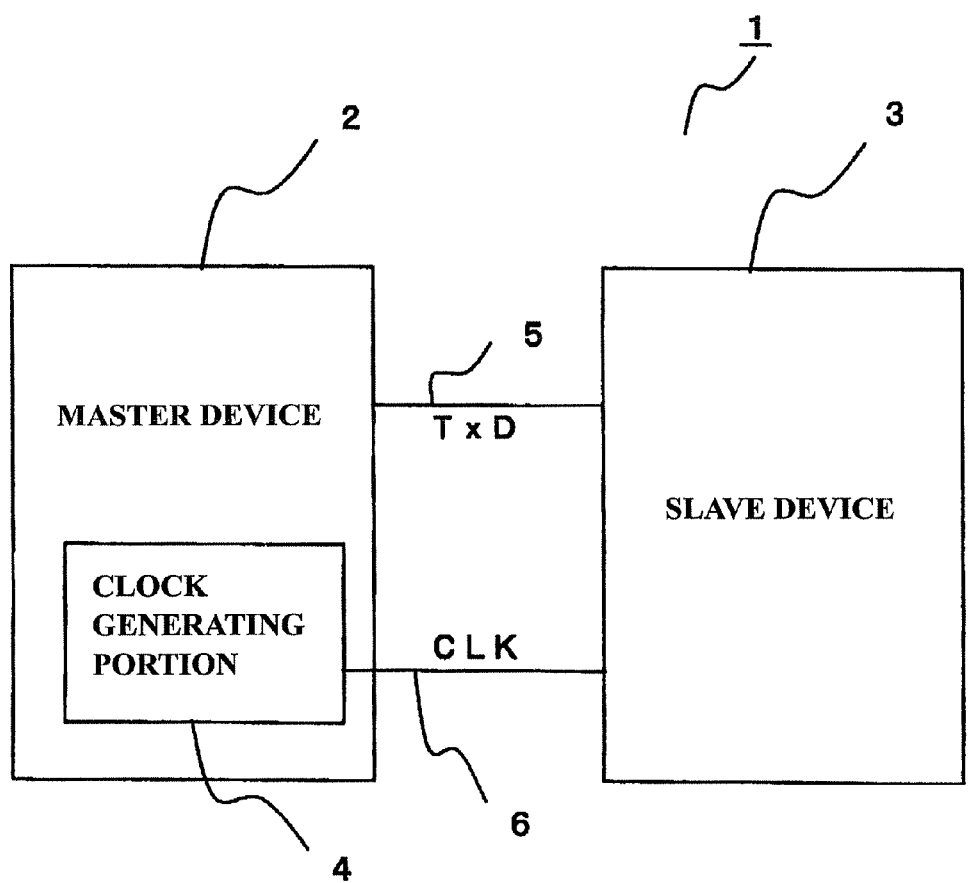
FIG. 2 is a block diagram that shows an instance of a structure of a serial data communication system according to the invention.

1 . . . serial data communication system
2 . . . master device
3 . . . slave device
101 . . . serial data communication system
102 . . . master device
103 . . . slave device
CLK . . . clock signal
data 1, data 2, data 3 . . . data body
dummy . . . dummy data
$R_xD$ . . . serial data
$T_xD$ . . . serial data
Δt . . . amount of shift of data

BEST MODE FOR CARRYING OUT THE INVENTION

Figure 3:
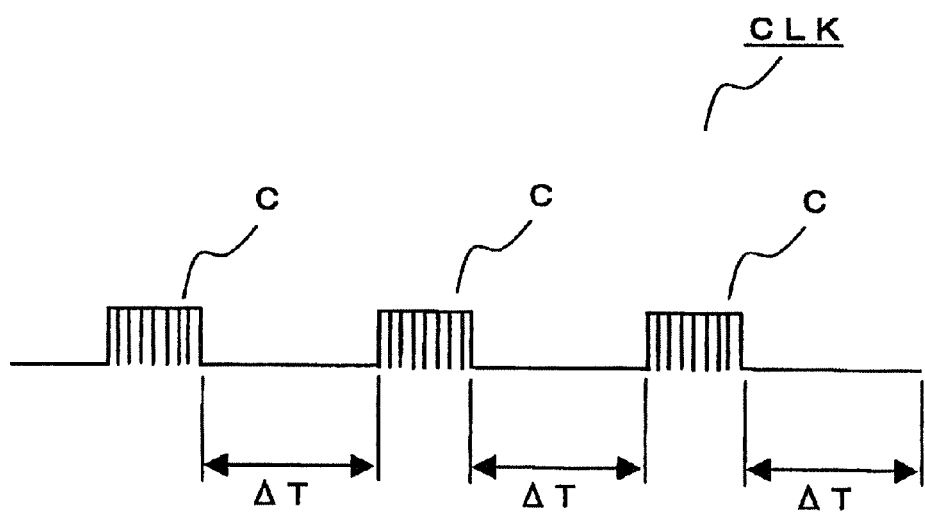
FIG. 3 is a view of waveform that shows an instance of a waveform of a clock signal.
Figure 4:
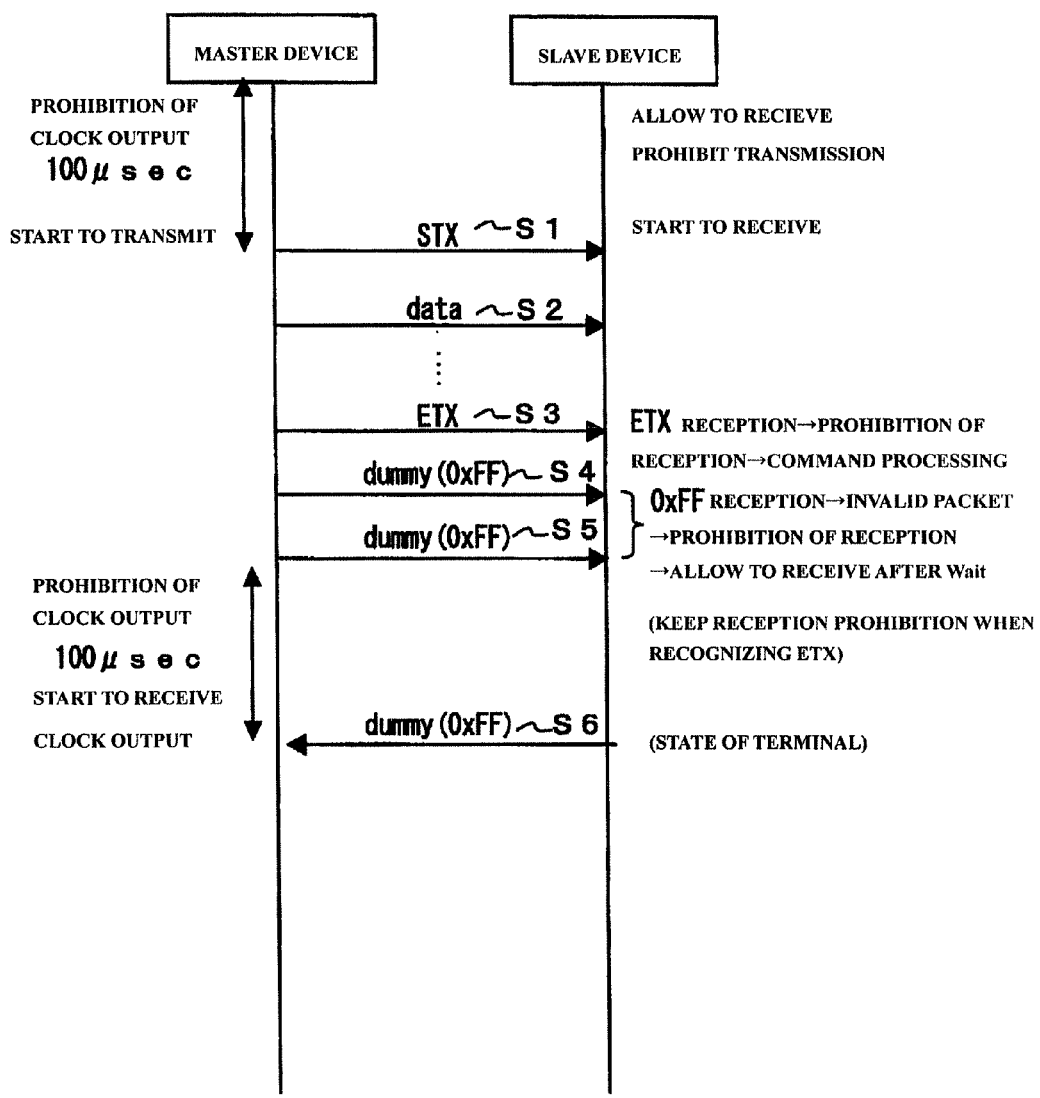
FIG. 4 is a view that shows an instance of a serial data communication method according to the invention.

The best mode for carrying out the invention is now mentioned, referring to FIGS. 1 through 4. FIG. 1(a) is a view for explaining a shift condition of serial data transmitted from a master device, FIG. 1(b) is a typical view for explaining operations at the time of data reception finish, FIG. 2 is a block diagram that shows an instance of a structure of a serial data communication system according to the invention, FIG. 3 is a view of waveform that shows an instance of a waveform of a clock signal, and FIG. 4 is a view that shows an instance of a serial data communication method according to the invention.

A serial data communication system according to the invention is exemplarily shown with a reference numeral 1 in FIG. 2, and is comprised of
a master device 2,
a slave device 3,
a clock generating portion 4 provided at the master device 2 for generating clock signals CLK,
a data line 5 between the master device 2 and the slave device 3, for transmitting serial data $T_xD$ from the master device 2 to the slave device 3, and
a clock line 6 between the master device 2 and the slave device 3, for transmitting the clock signal CLK from the clock generating portion 4 to the slave device 3.

In this structure, the clock signal CLK is transmitted from the master device 2 to the slave device 3 and the serial data $T_xD$ is transmitted, synchronizing with the clock signal CLK.

The serial data $T_xD$ has at least data body, data 1 through data 3, and two or more bytes of dummy data, dummy and dummy, as exemplarily shown with a reference mark $T_xD1$ in FIG. 1(a). These two or more bytes of dummy data, dummy and dummy, have an identical structure (that is, corresponding bits of the respective dummy data are all the same, such as 0xFF, 0xFF, . . . and 0x00, 0x00, . . . ) and are added after the data body, data 1 through data 3, succeeding these data. Preferably, before the data body, data 1 through data 3, STX (control code of text start) is added, and ETX (control code of text finish) is added between the data body, data 1 through data 3, and the dummy data, dummy. In a case of communication with binary code, it is necessary not to use dummy data for the data body data1, . . . , but in a case of communication with character codes (7 bit—ASCII code), there is no such a limitation. Besides, in the clock signal CLK, two or more (eight bits, for instance) bits clock C may be transferred at predetermined intervals Δt, such as 40 μsec, as fully shown in FIG. 3, but if the master device and the slave device have good efficiency, ΔT=0 μsec, that is, clock C may be transferred, being connected with each other.

On the other hand, the slave device 3 may have the following structure. That is, (a) In a case where signals excluding the dummy data (0xFF or 0x00) and EXT are recognized, reception start is determined and data is received from the master device 2 (see a reference mark S1 in FIG. 4, for instance).

(b) In case of reception start, respective data received are stored in a receive buffer (see a reference mark S2 in FIG. 4).

(c) In a case where ETX is recognized, finish of data transmission is judged, and reception prohibition is determined and a command processing is done (see a reference mark S3 in FIG. 4).

(d) In a case where the dummy data, such as 0xFF or 0x00, is recognized, the reception is prohibited and the data stored in the receive buffer is processed, for instance, the data is discarded as an invalid packet, and reception is permitted after Wait for a predetermined time. In a case where the received data is only shifted, that is, in a case where the whole data is shifted by adding garbage data to a top of the data, amount of shift may be detected so as to analyze the data without discarding the data (the details is mentioned hereinafter).

The serial data communication method according to the invention is a method of transmitting the serial data TxD from the master device 2 to the slave device 3, synchronizing with the clock signal CLK wherein the master device 2 transmits the serial data $T_xD$ having the above-mentioned structure to the slave device 3 and the slave device 3 judges finish of the data transmission when the dummy data, dummy, is recognized.

As mentioned above, the serial data is transmitted from the master device 2 to the slave device 3, synchronizing with the clock signal CLK. If garbage data (see a reference numeral 8) is attached to the serial data as shown with a reference mark TxD2 in FIG. 1(a), the serial data itself may be shifted due to shift of synchronization, that is, timing t1 of start of one character of clock and timing t2 of reception start of data may be shifted. Operations at such a time are mentioned, referring to FIGS. 1 and 4.

The slave device 3 receives garbage data 8 and a part of STX in a period of A1 in FIG. 1(a). Since thus received data is not dummy data, dummy, nor ETX, reception start is judged according the conditions as shown in the above-mentioned (a), and the data is started to be captured. For this reason, respective data that are shifted are received in periods A2, A3 and A4 (see S2 of FIG. 4).

Some data and a part of ETX are received in period A5. But, ETX is not recognized due to the shifted data, so that data finish is not judged (see the above-mentioned (c)). In a next period A6, a remaining part of ETX and a part of dummy data, 0xFF are received. In such a case also, EXT and the dummy data 0xFF are not recognized, and data finish is not judged (see (c) and (d)). But, the slave device 3 can recognize the dummy data 0xFF since a part of the first dummy data 0xFF and a part of the second dummy data 0xFF are received in a period A7. Then, finish of receiving of the whole data is known. If such received data is discarded for reasons of shift of data, the data reception and data transmission are wasteful. Then, it is preferable to analyze the data by obtaining amount of data shifted through a proper method. Preferably, the slave device 3 prohibits reception at the time when recognizing the dummy data 0xFF, and allows to receive data after waiting for a predetermined time, but, this permission of data receiving should be done during a time when not receiving the clock signal CLK. In an instance of FIG. 4, after the master device 2 outputs the second dummy data, dummy (see S5), the master device 2 does not output the clock signal for 100 μsec in order to transfer to the data receiving from the slave device 3. In a case of the above-mentioned invalid packet, it is preferably to allow receiving of data during such a time. After passing 100 μsec, the master device 2 outputs the clock signal for receiving data from the slave device 3, but the slave device 3 that allowed to receive data does not transmit data. For this reason, the master device 2 receives a state of the terminal, dummy (0xFF). If such data 0xFF is received, the receiving of data is not started due to the above-mentioned (a), the data 0xFF is discarded without storing. In the case where the data is analyzed by obtaining the amount of shift as mentioned above, it is necessary to recognize a top of data (in other words, a boundary between the dummy data, dummy, and the serial data TxD). In the instance as shown in FIG. 1 and FIG. 4, the final bit of the dummy data 0xFF is "1" and the initial bit of the serial data $T_xD$ (that is, the initial bit of STX ($0_x02$)) is "0", so that the boundary can be recognized even in LSB first or MSB first. For this reason, it is possible to analyze the data as mentioned above. That is, it is necessary to select the top data of the serial data and the dummy data so as to recognize the boundary.

If the serial data from the master device 2 is properly received in a state of TxD1 without being shifted as TxD2, ETX is recognized in the period A5, and finish of receiving of the whole data is known. After the slave device 3 finished receiving of the whole data, the receiving of data is prohibited and a command processing is done (see S3 of FIG. 4). After the master device 2 outputs the second dummy data, dummy (see S5), the output of the clock is prohibited for a predetermined time.

Figure 7:
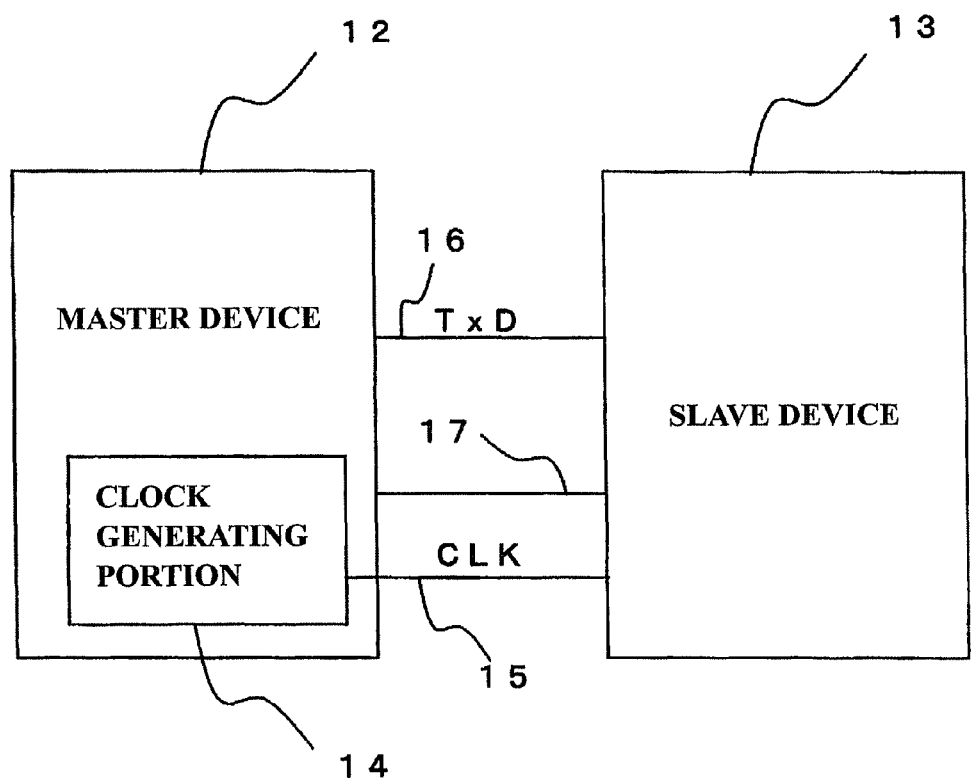
FIG. 7 is a block diagram that shows another instance of the conventional structure of the serial data communication system.
Figure 8:
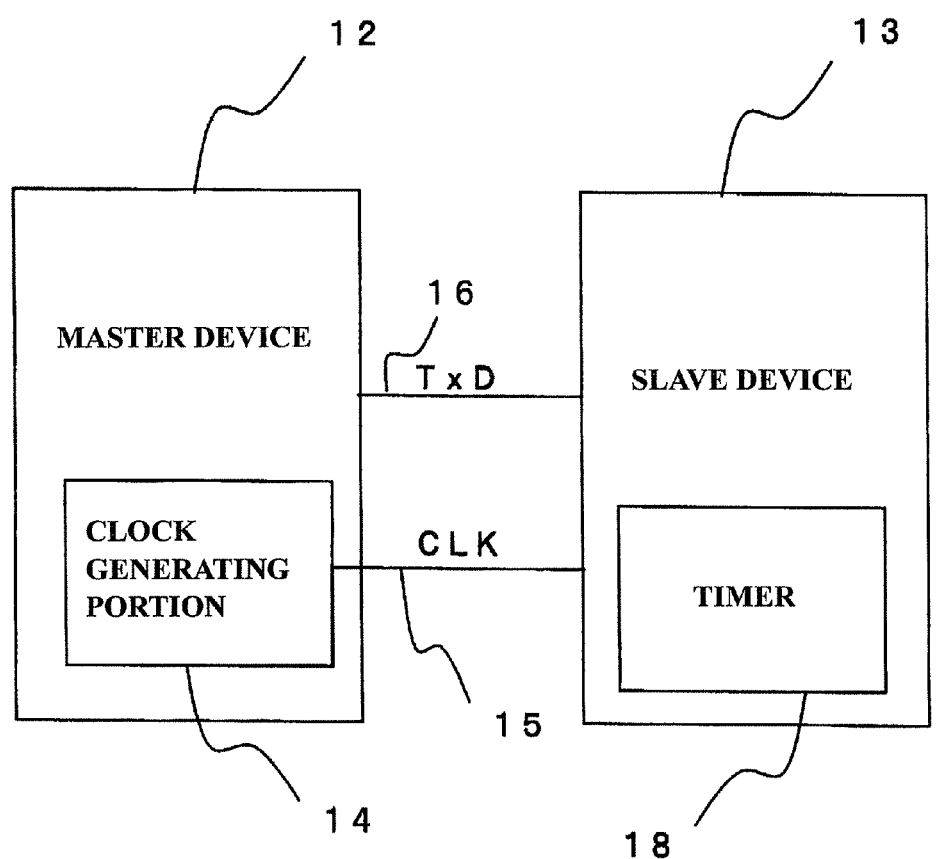
FIG. 8 is a block diagram that shows another alternate instance of the conventional structure of the serial data communication system.

According to the invention, two or more continuous bytes of dummy data having an identical structure are located, and the receiving of data is promptly prohibited when the slave device 3 recognizes the dummy data, dummy. Therefore, even if the data transmitted to the slave device 3 is shifted by an affect of a noise (also in error clock operation) or ETX is not recognized due to garbled character (unreadable character), it is possible to recognize the dummy data, dummy, and to know finish of the transmission of the serial data TxD by recognizing the dummy data, dummy, and to do a proper processing. Besides, according to the invention, a cost for the handshake line (17 of FIG. 7) and the timer (18 of FIG. 8) is not saved since both are not necessary to be provided. Furthermore, according to the invention, a judgment on the invalid packet can be immediately done by recognizing the dummy data, dummy, and a time from recognition of a communication error to a return can be shortened although data waiting continues after finish of clocking in a case of a type with the timer 18. And, according to the invention, the above-mentioned system can be easily constructed by only changing existent software of the serial data communication system. Furthermore, since the algorithm is simple, the CPU is not necessary to be high speedy one nor high functional one, and a change of the CPU is not necessary.

Figure 9:
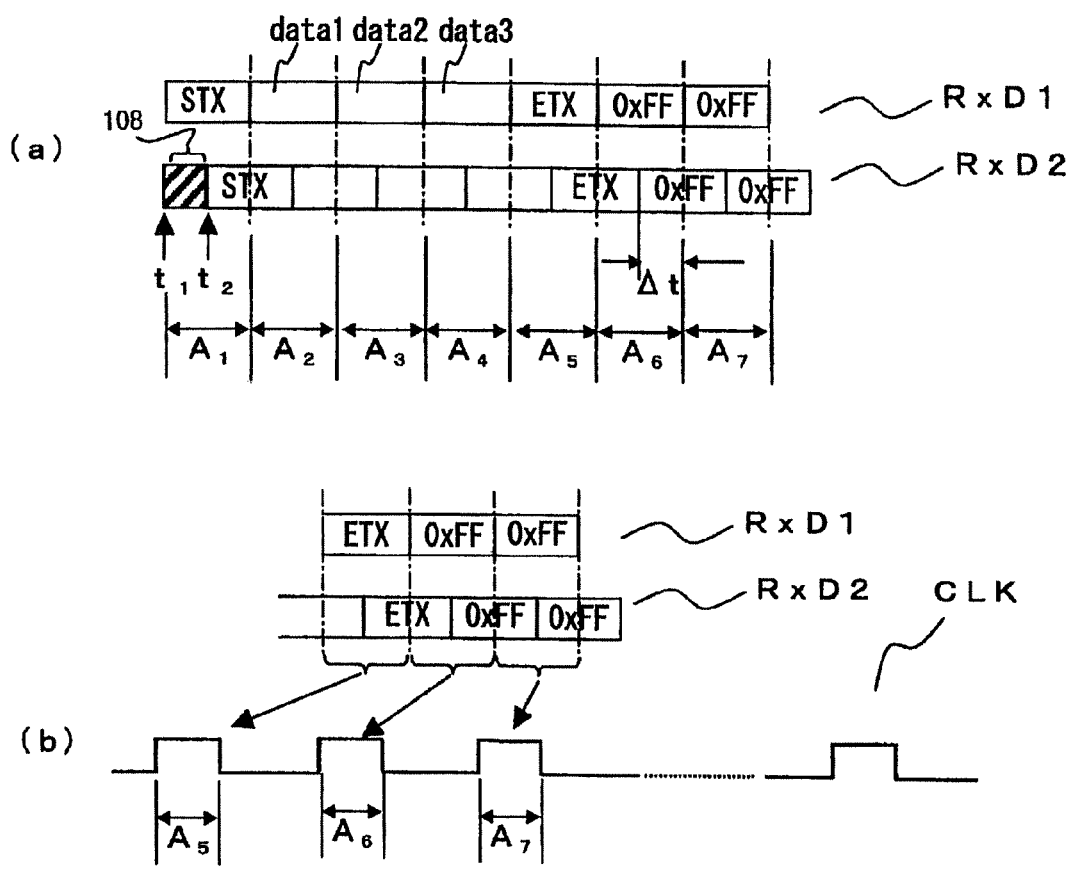
FIG. 9(a) is a view for explaining a shift condition of the serial data from the slave device.
FIG. 9(b) is a typical view for explaining operations at the time of data reception finish.
Figure 10:
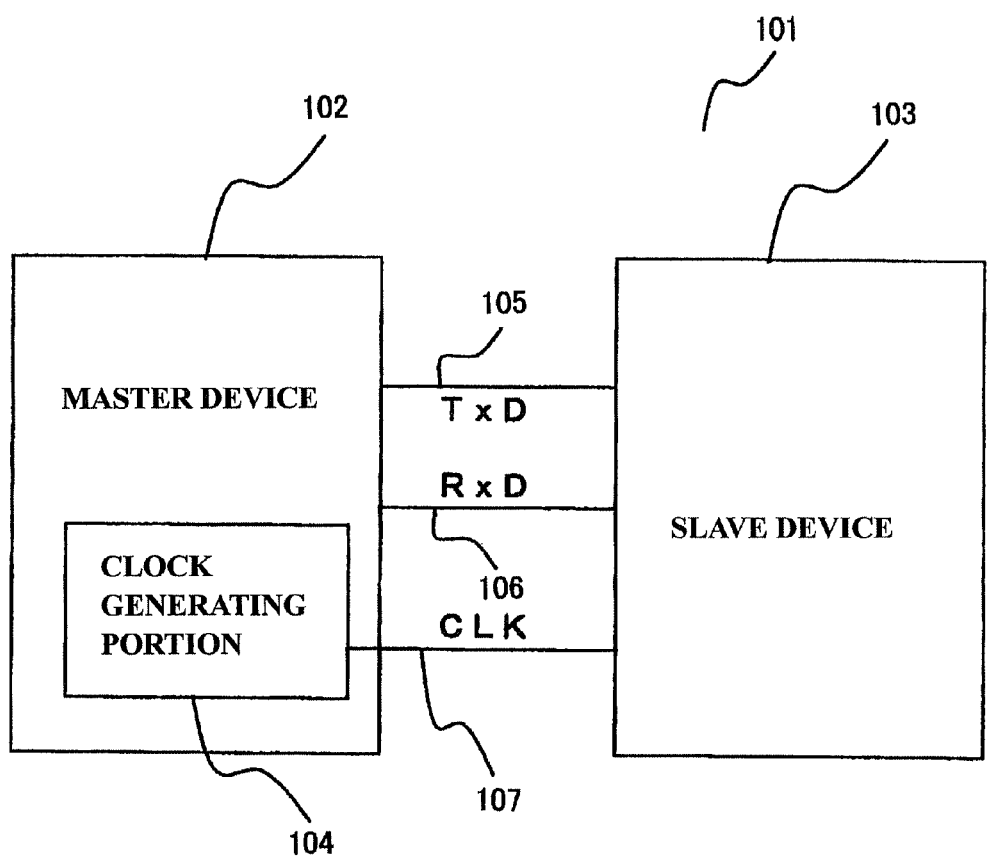
FIG. 10 is a block diagram that shows a structure of the serial data communication system according to the invention.
Figure 11:
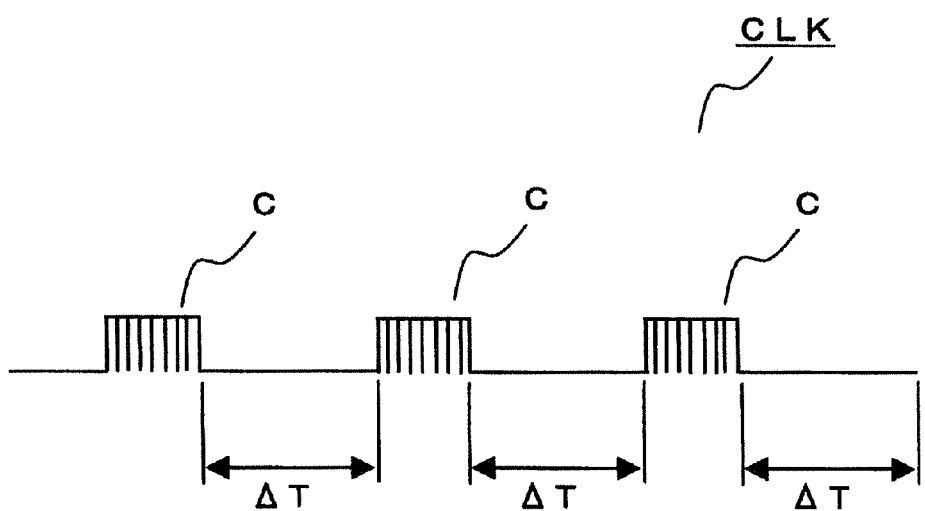
FIG. 11 is a view of waveform that shows a waveform of the clock signal.
Figure 12:
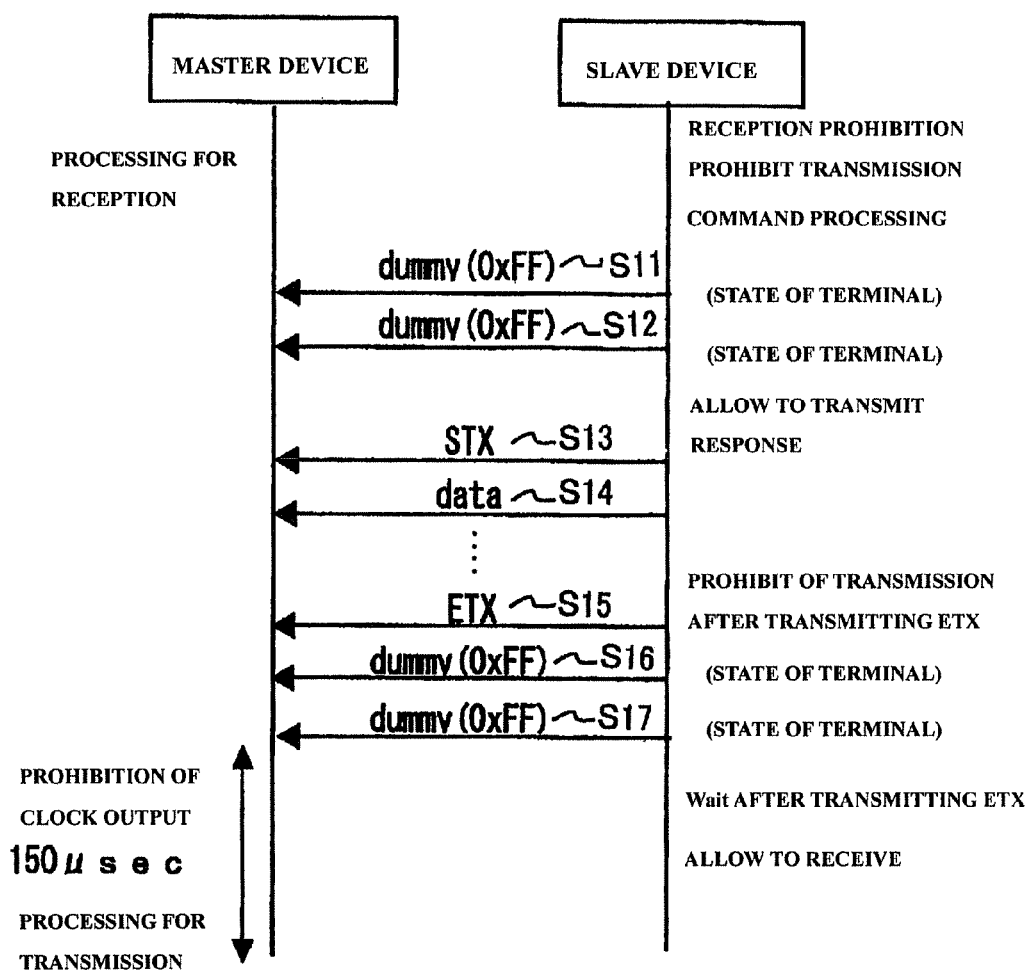
FIG. 12 is a view that shows an instance of the serial data communication method according to the invention.

An alternate best mode for carrying out the invention is now mentioned, referring to FIGS. 9 through 12. FIG. 9(a) is a view for explaining a shift condition of the serial data transmitted from the slave device, FIG. 9(b) is a typical view for explaining operations at the time of data reception finish, FIG. 10 is a block diagram that shows a structure of the serial data communication system according to the invention, FIG. 11 is a view of waveform that shows a waveform of the clock signal, and FIG. 12 is a view that shows an instance of the serial data communication method according to the invention.

A serial data communication system according to the invention is exemplarily shown with a reference numeral 101 in FIG. 10, and is comprised of a master device 102, a slave device 103, a clock generating portion 104 provided at the master device 102 for generating clock signals CLK, a first data line 105 between the master device 102 and the slave device 103, for transmitting serial data $T_xD$ from the master device 102 to the slave device 103, a second data line 106 between the master device 102 and the slave device 103, for transmitting serial data $R_xD$ from the slave device 103 to the master device 102, and a clock line 107 between the master device 102 and the slave device 103, for transmitting the clock signal CLK from the clock generating portion 4 to the slave device 103.

In this structure, the clock signal CLK is transmitted from the master device 102 to the slave device 103, and duplex communication of the serial data is possible between the master device 102 and the slave device 103.

As exemplarily shown in FIG. 9(a), serial data RxD is preferably comprised of STX (control code of text start) and data body, data1, data2 and data3, and ETX (control code of text finish). Besides, in the clock signal CLK, two or more (eight bits, for instance) bits clock C may be transferred at predetermined intervals ΔT, such as 40 μsec, as fully shown in FIG. 11, but if the master device and the slave device have good efficiency, ΔT=0 μsec, that is, clock C may be transferred, being connected with each other.

In the above-mentioned slave device 103, after transmitting the serial data RxD (see S13, S14, S15 of FIG. 12), the transmission of data is prohibited and the state of the terminal is fixed into a high level 0xFF or a low level 0x00 (see S16, S17 of FIG. 12). The signal showing the state of the terminal is referred to as "the dummy data" hereinafter.) That is, in the serial data communication system 101 according to the invention, the dummy data, dummy, is defined as 0xFF in the master device 102 if the state of the terminal of the slave device 103 (the state of the terminal during a time when not transmitting data) is H, and the dummy data, dummy, is defined as 0x00 in the master device 102 if the state of the terminal of the slave device 103 (the state of the terminal during a time when not transmitting data) is L without adding the dummy data, dummy, to the last part of the serial data RxD transferred from the slave device 103 to the master device 102.

The other master device 102 has the following structure.

(a) In a case where signals excluding dummy data (0xFF or 0x00) and ETX are recognized, reception of data is determined and data is received from the slave device 103 (see a reference mark S13 in FIG. 12, for instance)

(b) In case of reception start, respective data received are stored in a receive buffer.

(c) In a case where ETX or dummy data (0xFF or 0x00) is recognized, reception is prohibited, and the data is analyzed (see S15, S16 and S17 of FIG. 12).

In the serial data communication system 101 according to the invention, the serial data RxD is transmitted from the slave device 103 to the master device 102 without synchronizing with the clock signal CLK. When the slave device 103 finishes preparing transmission of the serial data RxD, that is, at an optional timing, such data is transmitted. For this reason, the serial data RxD may be received, being shifted from the clock signal CLK, as shown in a reference mark RxD2 in FIG. 9(a) (In other words, timing t1 that is start of the clock of one character and timing t2 that is start for receiving data may be shifted). Operations at such a time are now mentioned.

Until the slave device 103 starts to transmit the serial data RxD to the master device 102, the state of the terminal is fixed (for instance, 0xFF) as mentioned above, and the master device 102 receives such a state of terminal as data (see S11, S12 of FIG. 12). In this state, receiving of data is not started due to the condition of the above-mentioned (a), and the dummy data, dummy, is discarded without being stored. And, the clock signal CLK is transferred from the master device 102 to the slave device 103 through the clock line 107.

Assuming that STX is transmitted from the fourth bit of the eight bit of clock signal in the period as shown with A1 in FIG. 9(a), the first through third bit of data (see 108) is recognized as garbage data, and a part of STX is received in the fourth through eighth bits of data. Such a received data is not dummy data, dummy, nor ETX. Therefore, the receiving of data is determined according to the condition of the above-mentioned (a), and the data is started to be captured. And, each data is received, being shifted in periods A2, A3 and A4 (see S14 of FIG. 12).

In a period A5, some data and a part of ETX are received. But, the data are not recognized as ETX due to the shifted data, so that data finish is not judged. In the next period A6, a remaining part of ETX and a part of the dummy data 0xFF are received. In this case also, ETX is not recognized and the dummy data 0xFF is not recognized, so that the data finish is not judged. However, a part of the first dummy data 0xFF and a part of the second dummy data 0xFF are received in a period A7, and the master device 102 can recognize the dummy data 0xFF, so that finish of receiving of the whole data is known. In this case, preferably the master device 102 recognizes the dummy data 0xFF and executes bit analysis so as to compute amount of shift of data from the slave device 103 (see $\Delta t$ of FIG. 9(a)). Besides, amount of shift $\Delta t$ may be computed with a code for synchronization that is defined separately from the dummy data. By thus obtaining the amount of shift $\Delta t$, it is possible to assemble BYTE data. In the case of such data analysis, it is necessary to recognize the top of the data (In other words, the boundary between the dummy data, dummy, and the serial data RxD). In the instance as shown in FIG. 9 and FIG. 12, the final bit of the dummy data 0xFF is "1" and the initial bit of the serial data RxD (that is, STX(0x02) is "0". Therefore, the boundary can be recognized even in LSB first or MSB first, and it is possible to do the above-mentioned data analysis. That is, it is necessary to select the top data of the serial data and the dummy data so as to recognize the boundary. After assembling the data, an analysis as to whether or not the data is proper is executed by a proper method, preferably.

If the serial data from the slave device 103 is properly received in a state of RxD1, without being shifted as RxD2, ETX is recognized in the period A5 and finish of receiving of the whole data is known. And, after the master device 102 finishes receiving of the whole data (see S15, S16 and S17 of FIG. 12), output of the clock signal CLK is prohibited for a predetermined period, such as 150 μsec. In a case of communication with binary code, it is necessary not to use dummy data for the data body, data1, . . . and the like, and it is necessary that the code identical with the dummy data does not appear in a combination with adjacent data body, such as data1 and data2. If data is transmitted from LSB with character code (7 bit-ASCII code) in a condition that the dummy data, dummy, is 0xFF, there is no such a limitation, so that this is suitable for, the communication with such a system.

Figure 14:
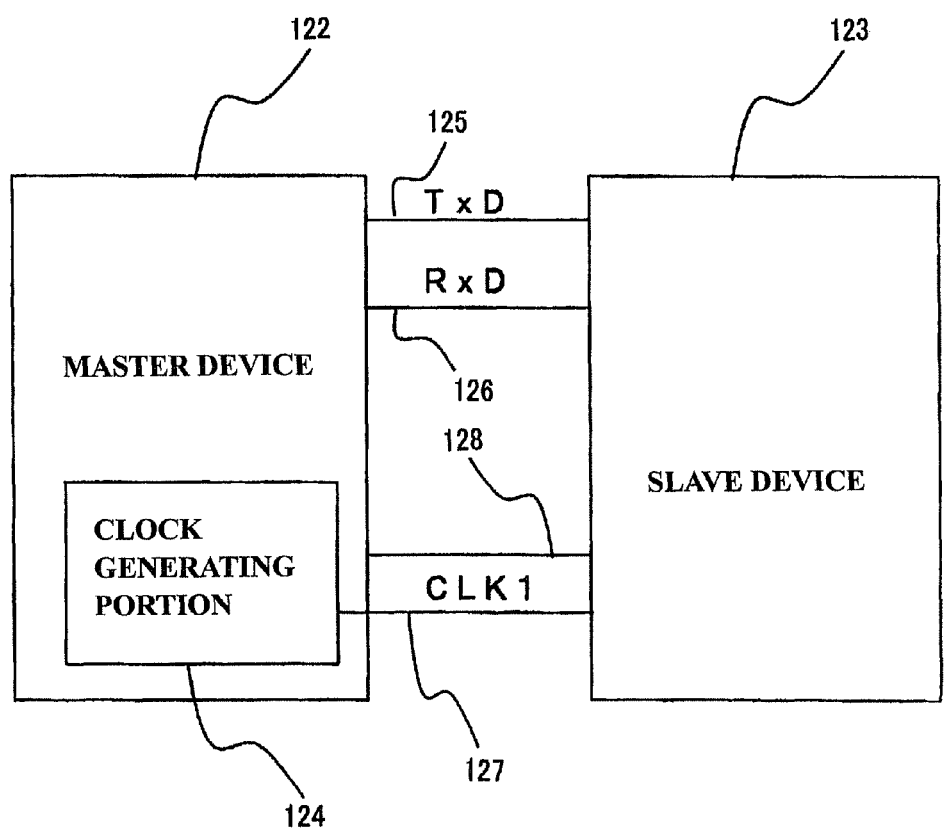
FIG. 14 is a block diagram that shows another instance of the conventional structure of the serial data communication system.

According to the invention, even if the serial data RxD is shifted without synchronizing the serial data RxD and the clock signal CLK with each other or ETX is not recognized due to an affect of noise, the dummy data, dummy, is recognized and finish of transmission of the serial data RxD is known, so that each received data can be analyzed. Besides, according to the invention, the cost for the handshake line (see 128 of FIG. 14) and the clock generating portion (see 130 of FIG. 15) can be saved since both are not necessary to be provided. Furthermore, according to the invention, even if ETX can not be recognized by affects of shifted data or noise, finish of data is promptly known by recognizing the dummy data, dummy, so that the master device 102 is not in a data waiting state (that is, it is not necessary that timeout period is provided for receiving final data and the clock signal CLK is continuously transmitted until receiving the final data), and the time from recognition of a communication error to return can be shortened. And, according to the invention, since BYTE data is not assembled by checking each bit upon occasions during receiving of data but is assembled after receiving the data, the analysis can be done in a rather longer time, so that a low speed CPU is sufficient and the device can be made cheaper.

The serial data communication method according to the invention is that the clock signal CLK is transmitted from the master device 102 to the slave device 103 and a duplex communication of serial data is possible between the master device 102 and the slave device 103, and has such characteristics that the slave device 103 prohibits data transmission after transmitting serial data RxD and fixes the state of the terminal into a high level, 0xFF or a low level 0x00 and the master device 102 allows data receiving start when recognizing the signal excluding the above-mentioned state of the terminal and receives data from the slave device 103, and prohibits data receiving when recognizing the signal, dummy, showing the above-mentioned state of the terminal so as to analyze the data.

Preferably, in this case the master device 102 calculates amount of shift of data $\Delta t$ from the slave device 103 by recognition of the signal, dummy.

INDUSTRIAL APPLICABILITY

The serial data communication system and the serial data communication method according to the invention can be used for the whole machines for data communication.

The invention claimed is:

1. A serial data communication system for transmitting a clock signal from a master device to a slave device, and for duplex communication of serial data between said master device and said slave device, the system comprising:
   said slave device prohibiting data transmission after transmitting serial data and fixes a signal representing a state of a terminal of the slave device to 0xFF; and
   said master device determining reception start and receives the serial data from said slave device when any signal other than 0xFF or a control code of text finish is recognized and prohibits reception of the serial data when 0xFF or the control code of text finish is recognized,
   wherein said serial data is comprised of a control code of text start, a data body, and the control code of text finish, and said data body uses 7 bit-ASCII code.

2. The serial data communication system according to claim 1, wherein said master device computes amount of shift of data transmitted from said slave device by recognizing the signal showing the state of said terminal.

3. A serial data communication method for transmitting a clock signal from a master device to a slave device, and for duplex communication of serial data between said master device and said slave device, the method comprising:
   said slave device prohibiting data transmission after transmitting serial data and fixes a signal representing a state of a terminal of the slave device to 0xFF; and
   said master device determining reception start and receives the serial data from said slave device when any signal other than 0xFF or a control code of text finish is recognized and prohibits reception of the serial data when 0xFF or the control code of text finish is recognized,
   wherein said serial data is comprised of a control code of text start, a data body and the control code of text finish, and said data body uses 7 bit-ASCII code.

4. The serial data communication method according to claim 3, wherein said master device computes amount of shift of data transmitted from said slave device by recognizing the signal showing the state of said terminal.

* * * * *